United States Patent
Maude et al.

(10) Patent No.: US 9,223,778 B2
(45) Date of Patent: *Dec. 29, 2015

(54) NET MODERATOR

(71) Applicant: Crisp Thinking Group Ltd., Leeds (GB)

(72) Inventors: Peter Maude, Leeds (GB); Adam Hildreth, Leeds (GB)

(73) Assignee: CRISP THINKING GROUP LTD., Leeds (GB)

( * ) Notice: Subject to any disclaimer, the term of this patent is extended or adjusted under 35 U.S.C. 154(b) by 276 days.

This patent is subject to a terminal disclaimer.

(21) Appl. No.: 13/897,388

(22) Filed: May 18, 2013

(65) Prior Publication Data

US 2013/0253914 A1    Sep. 26, 2013

Related U.S. Application Data

(63) Continuation of application No. 12/901,516, filed on Oct. 9, 2010, now Pat. No. 8,473,281.

(60) Provisional application No. 61/250,259, filed on Oct. 9, 2009.

(51) Int. Cl.
  *G06F 17/28* (2006.01)
  *H04L 12/18* (2006.01)
  *H04L 12/58* (2006.01)

(52) U.S. Cl.
  CPC ............ *G06F 17/28* (2013.01); *H04L 12/1827* (2013.01); *H04L 12/585* (2013.01)

(58) Field of Classification Search
  CPC .................................................. H04L 12/585
  USPC ............................................................. 704/9
  See application file for complete search history.

(56) References Cited

U.S. PATENT DOCUMENTS

| | | |
|---|---|---|
| 5,835,722 A | 11/1998 | Bradshaw et al. |
| 6,029,195 A | 2/2000 | Herz |
| 6,065,056 A | 5/2000 | Bradshaw et al. |
| 6,438,632 B1 | 8/2002 | Kikugawa |
| 7,194,255 B2 | 3/2007 | Boman et al. |
| 8,117,281 B2 * | 2/2012 | Robinson et al. ............. 709/218 |
| 8,244,830 B2 * | 8/2012 | Robinson et al. ............. 709/217 |

(Continued)

FOREIGN PATENT DOCUMENTS

WO    2005038670 A1    4/2005

OTHER PUBLICATIONS

Penna, L., et al., "Challenges of Automating the Detection of Paedophile Activity on the Internet", "Proceedings of the First International Workshop on Systematic Approaches to Digital Forensic Engineering", 2005, pp. 1-15, Publisher: IEEE.

*Primary Examiner* — Susan McFadden
(74) *Attorney, Agent, or Firm* — Hultquist, PLLC; Steven J. Hultquist

(57) ABSTRACT

A method and an apparatus for moderating an inappropriate relationship between two parties by analyzing a dialog between the two parties. The method and apparatus creates an alert depending upon the nature of the dialog between the two parties. The alert is sent to a third party who can moderate the relationship between the two parties. The third party can ban or block the dialog between the two parties based upon the inappropriate relationship between the two parties. A banning or block of the dialog between the two parties can also be automated.

20 Claims, 2 Drawing Sheets

(56) References Cited

U.S. PATENT DOCUMENTS

| | | | |
|---|---|---|---|
| 8,356,077 B2* | 1/2013 | Robinson et al. | 709/207 |
| 8,473,281 B2* | 6/2013 | Maude et al. | 704/9 |
| 8,676,937 B2* | 3/2014 | Rapaport et al. | 709/219 |
| 8,707,185 B2* | 4/2014 | Robinson et al. | 715/751 |
| 8,725,826 B2* | 5/2014 | Robinson et al. | 709/207 |
| 2002/0013692 A1 | 1/2002 | Chandhok et al. | |
| 2003/0033405 A1 | 2/2003 | Perdon et al. | |
| 2011/0087485 A1 | 4/2011 | Maude et al. | |
| 2012/0290950 A1* | 11/2012 | Rapaport et al. | 715/753 |

\* cited by examiner

NET MODERATOR

CROSS REFERENCE TO RELATED APPLICATIONS

This application is a continuation under 35 USC 120 of U.S. patent application Ser. No. 12/901,516 filed Oct. 9, 2010, which in turn claims benefit under 35 USC 119(e) of U.S. Provisional Patent Application No. 61/250,259 filed Oct. 9, 2009. The disclosures of U.S. patent application Ser. No. 12/901,516 and U.S. Provisional Patent Application No. 61/250,259 are hereby incorporated herein by reference in their entireties, for all purposes.

FIELD OF INVENTION

The field of the present disclosure relates to an apparatus and a method for monitoring a relationship between two parties by analyzing a dialog between the two parties.

BACKGROUND OF INVENTION

A number of virtual chat networks are known to exist, such as those provided by social networks (e.g. Facebook, Myspace), massively media online games (MMOG), online instant messaging applications (e.g. Yahoo Messenger, MSN Messenger), ICQ applications and SMS based applications.

Virtual chat networks allow a first party and a second party to be involved in a dialog with each other, without the two parties needing to be physically present at the same location. The dialog between the two parties using the virtual chat network is an ubiquitous form of communication in the modern society. Millions of parties communicate with each other through the virtual chat networks while at school, home or at work. The virtual chat networks have advantages in that they provide a network that enables ease of dialog between the two parties. Continual advances in the technology and ease of use of the virtual chat networks have made the virtual chat networks a common platform for dialog communication between two parties.

The use of the virtual chat network for the dialog between the first party and the second party has known disadvantages. For example, the identity of parties to the dialog can not be reliably confirmed. The parties engaged in the dialog might be involved in inappropriate and illegal dialog which cannot be easily monitored or mediated. The honesty of the parties cannot be readily determined. A particular area where the anonymity of the parties engaged in the dialog is a particular problem, where one of the parties is "grooming" the other party for a paedophilic relationship.

The use of the virtual chat network for the dialog between the first party and the second party has further issues. For example, the dialog between the two parties can be related to illegal activities such as spamming, bullying, child grooming espionage, industrial espionage, terrorism, security and legal compliance.

Many of the known methods and apparatus currently available to analyze the dialog between the two parties are ineffective and cumbersome to administer. The known methods and apparatus require an enormous amount of administration by a moderator (e.g. a trained supervisor). The moderator may be required to study the dialog in its entirety over weeks and months in order to ascertain if a potentially inappropriate relationship between the first party and the second party is developing. Furthermore the moderator will need to act upon instinct to moderate the dialog and to take action depending upon the nature of the relationship as indicated by the dialog. Furthermore an invasion of privacy may also hinder the ability of the moderator to monitor the dialog between the two parties.

Hence, it would be advantageous to have a method and an apparatus to moderate a relationship between two parties by analyzing the dialog between the two parties.

PRIOR ART

A number of prior art documents are known which attempt to analyze inappropriate dialog.

U.S. Patent Application Publication No. 2002/0013692 A1 discloses an e-mail system that identifies if an e-mail conforms to a specific language type. A scoring engine compares text of the e-mail to a known language model. A user interface assigns a language indicator to the e-mail based upon a score provided by a scoring engine. The U.S. Patent Application Publication No. 2002/0013692 discloses a graphical flagging of the e-mail according to a language content of the e-email. The U.S. Patent Application Publication No. 2002/0013692 A1 does not disclose a method or an apparatus for analyzing a dialog between two parties to moderate a relationship between the two parties.

A U.S. Pat. No. 6,438,632 B1 discloses an electronic bulletin board system that identifies inappropriate and unwanted bulletin postings by users, using an unwanted words list. If an unwanted bulletin posting is identified, then the unwanted bulletin posting is withdrawn from the electronic bulletin board and a moderator of the electronic bulletin board and a user is informed that the bulletin posting is inappropriate for the electronic bulletin board. The U.S. Pat. No. 6,438,632 B1 does not disclose a method or an apparatus for analyzing a dialog between two parties to moderate a relationship between the two parties.

Finally, an article by L. Penna et al "Challenges of Automating the Detection of Paedophile Activity on the Internet", Proc 1$^{st}$ International Workshop on Systematic Approaches to Digital Forensic Engineering (SADFE '05) outlines the need for research into the process of automating the detection of inappropriate activities on the internet and identifies the associated challenges within the research area. The article by L. Penna overviews and analyses technologies associated with the use of the internet by paedophiles in terms of event information that each technology potentially provides. The article by L. Penna also reviews the anonymity challenges presented by these technologies. The article by L. Penna presents methods for currently uncharted research that would aid in the process of automating the detection of paedophile activities on the internet. The article by L. Penna includes a short discussion of methods involved in automatically detecting paedophile activities. The article by L. Penna does not disclose a method or an apparatus for analyzing a dialog between two parties to moderate a relationship between the two parties.

SUMMARY OF INVENTION

A method for monitoring a relationship between two parties, based on capturing and analyzing a textual dialog between the two or more parties, is disclosed. The dialog is captured from a virtual chat network and analyzed with a word and phrase filter engine. The captured dialog is then analyzed with a concept filter engine to determine a concept of the dialog. The dialog which is analyzed with the word and phrase filter engine and the concept filter engine is moderated to determine an existence of an inappropriate relationship between the two parties.

In a further aspect, the captured dialog between the two parties is further analyzed with a relationship status analysis engine.

In a further aspect, a result of an analysis of the dialog is sent to a third party who can review and moderate the dialog between the two parties. The third party can moderate the dialog for an inappropriate relationship between the two parties. The third party can be for example a moderator of virtual chat network, a parent of any one of the two parties or can be a police officer.

The dialog between the two parties can be analyzed in real time or in delayed time. In a further aspect a dynamic behavior profile of each one of the two parties can be created, by comparing a known dialog pattern of each one of the two parties with the captured dialog between the two parties.

The method allows the determination of the existence of the inappropriate relationship between the two parties based upon the analysis of the captured dialog from the virtual chat network. The method can prevent the dialog between two parties continuing based upon the analysis of the captured dialog.

The method allows a prioritization of alerts relating to results of the analysis of the captured dialog. The alerts can be used by the third party or any other person to ascertain the existence of the inappropriate dialog and relationship between the two parties.

Furthermore the method provides a plurality of engines which have editable parameters. The plurality of engines is used to analyze the captured dialog. The editable parameters allow for the method and a system disclosed herein to be dynamically updatable and allows for the analysis of the dialog which comprises changes in dialog the two parties.

An apparatus is also disclosed for monitoring the relationship between the two parties based on analyzing a captured dialog between two or more parties. The dialog is in the form of a textual based dialog which is captured from a virtual chat network. The apparatus comprises a relationship moderator engine to capture the dialog. The apparatus further comprises a word and filter phrase engine to analyze the dialog based on at least one keyword present in the dialog.

The apparatus further comprises a concept filter engine to determine a concept of the dialog that is evolving between the two parties. Furthermore, the apparatus comprises a transmitter which sends information regarding a dialog to a third party.

The apparatus according to a further aspect comprises a relationship moderator alert interface which is adapted to prioritize inappropriate captured dialog alerts between the two parties. The prioritization of inappropriate captured dialog alerts allows the third party to act upon any one of the two parties by for example by banning the one or more of the parties from being involved in a dialog.

In a further aspect, the apparatus comprises a storage device to store any of the captured dialog between any of the parties. The storage of the captured dialog allows the captured dialog to be used as evidence when one of inappropriate dialog or an inappropriate relationship exists between the two parties.

The apparatus is operable in the virtual chat network. The virtual chat network can be, but is not limited to, an online social network, a multimedia online gaming network, an online instant messaging application or a SMS based application.

DETAILED DESCRIPTION OF THE INVENTION

For a complete understanding of the present disclosure and the advantages thereof, reference is made to the following detailed description taken in conjunction with the accompanying Figures.

It should be appreciated that the various aspects and embodiments of the disclosure as disclosed herein are merely illustrative of specific ways to make and use the features of the disclosure and do not therefore limit the scope of disclosure when taken into consideration with the appended claims and the following detailed description and the accompanying Figures.

It should be realized that features from one aspect and embodiment of the disclosure will be apparent to those skilled in the art from a consideration of the specification or practice of the disclosure disclosed herein and these features can be combined with features from other aspects and embodiments of the disclosure.

Figure 1:
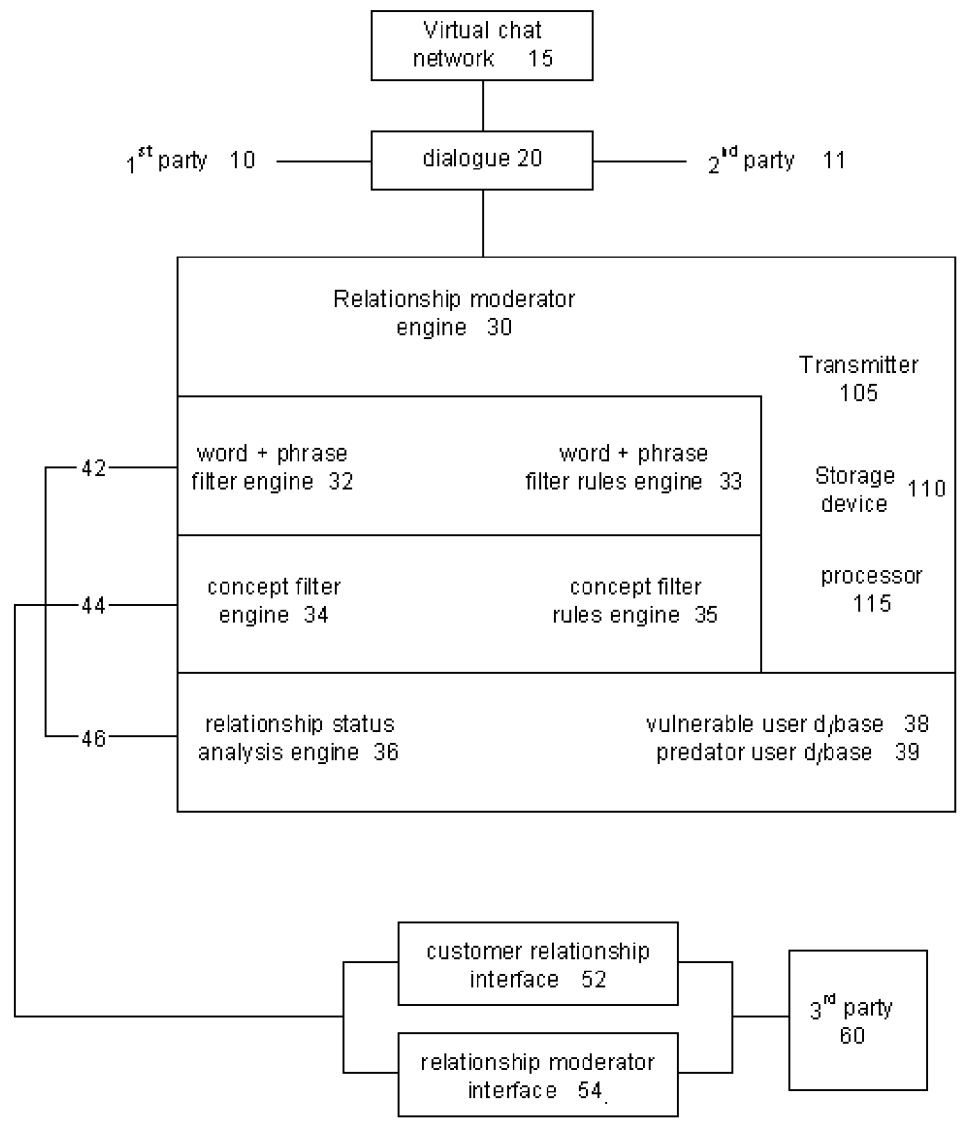
FIG. 1 shows an apparatus according to an aspect of the present disclosure.

FIG. 1 shows a schematic of a system 100. The system 100 is used to monitor and moderate a relationship between a first party 10 and a second party 11 based on analyzing a dialog 20 between the first party 10 and the second party 11. The first party 10 and the second party 11 are collectively known as the "two parties" 10 and 11. It will be appreciated that although this disclosure describes the system 100 with respect to two parties 10 and 11, the teachings are equally applicable to the system 100 in which more than two parties 10, 11 can participate in the dialog 20.

The relationship between the first party 10 and the second party 11 is analyzed to ascertain if the relationship between the two parties 10, 11 may be an illegal relationship or an inappropriate relationship. In one example of the present disclosure the first party 10 comprises a child and the second party 11 comprises an adult. The teachings of the present disclosure may therefore be used to detect a relationship that may be of a paedophilic nature. In a further example the first party 10 and the second party 11 can both comprise an adult. In a further example first party 10 and the second party 11 can both comprise a child.

The dialog 20 between the two parties 10, 11 occurs through a virtual chat network 15. The virtual chat network 15 can be for example by a social online network such as Facebook or MySpace. The virtual chat network 15 can be for example a massively media online game network (MMOG). The virtual chat network 15 can be for example an online instant messaging application such as Yahoo Messenger or MSN Messenger. The virtual chat network 15 can be an ICQ based application. The virtual chat network 15 can also for example be a SMS based application of a mobile telephone.

The first user 10 and the second user 11 can enter into the dialog 20 by the use of an internet enabled computer (not shown) or by a SMS enabled mobile telephone. The virtual chat network 15 enables the first user 10 and the second user 11 to engage in the dialog 20. The dialog 20 between the two users 10, 11 is in the form of a textual dialog 20.

The dialog 20 between the two parties 10, 11 is analyzed by a relationship moderator engine 30. The relationship moderator engine 30 comprises a word and phrase filter engine 32, a concept filter engine 34 and a relationship status analysis engine 36. The relationship moderator engine 30 further comprises a transmitter 105, a storage device 110 and a processor 115.

The word and phrase filter engine 32 provides short range dialog analysis. The word and phrase filter engine 32 analyses the captured dialog 20 between the two parties 10 and 11 based upon specific word and phrase content of the dialog 20 in real time. The word and phrase filter engine 32 comprises a word and phrase filter rules engine 33. The captured dialog 20 is analyzed using a "white list" and a "black list" of word and phrases provided for by the word and phrase filter rules engine 33. Should a specific word or phrase which is present in the "black list" of the word and phrase filter rules engine 33 be present in the captured dialog 20 then the specific word or phrase which is present in the "black list" between the two parties 10, 11 will be blocked and a censored dialog alert 42 will be created. Conversely should a specific word or phrase which is present on the "white" list of the word and phrase filter rules engine 33 be present in the captured dialog 20 then the dialog 20 between the two parties 10, 11 will be allowed to continue and again the censored dialog alert 42 will be created.

Parameters of the word and phrase filter rules engine 33 are editable. The edit-ability of the word and phrase filter rules engine 33 ensure that the word and phrase filter engine can be updated regularly to account for changes in the language used by either of the first party 10 and the second party 11 in the dialog 20. Changes in the language of the dialog 20 may take into account new slang terms and acronyms that may be used between the two parties 10, 11 engaged in the dialog 20. Example of acronyms used in the dialog 20 that can be analyzed by word and phrase filter engine 32 include "Hi m8" which would be analyzed by word and phrase filter engine 32 to mean "Hi mate"

"How r u?" which would be analyzed by word and phrase filter engine 32 to mean "How are you?"

"p0rn" which would be analyzed by word and phrase filter engine 32 to mean "porn"

The word and phrase filter engine 32 is able to analyze word and phrases of the captured dialog 20 that may not be written in the conventional form. The word and phrase filter engine 32 handles short range dialog analysis between the two parties 10, 11 by analyzing the captured dialog 20 to uncover low level inappropriate dialog 20 between the two parties 10, 11.

The word and phrase filter engine 32 blocks any inappropriate dialog 20 before the inappropriate dialog 20 reaches the intended party 10, 11 based upon the word and phrase filter rules engine 33 "black" list.

If the word and phrase filter engine 32 blocks any inappropriate dialog 20 before the inappropriate dialog reaches the intended party 10, 11 based upon the "black" list then the virtual chat network 15 is provided with the censored dialog alert 42. The censored dialog alert 42 comprises information relating to the dialog 20 and the words and phrases analyzed from the dialog 20 with the word and phrase filter rules engine 33. The virtual chat network 15 can act upon the censored dialog alert 42 and can, for example, ban or silence the one of the two parties 10, 11 who used the inappropriate dialog 20 that was on the "black list".

The words and phrases that are present in the "black list" of word and phrase filter rules engine 33 have a profanity score. The profanity score determines what action to take against one of the two parties 10, 11 in the virtual chat network. For example should the second party 11 use the word "fuck you" (which has a high profanity score), then the second party 11 may be banned form the virtual chat network. Furthermore the word "fuck you" will not be part of the dialog between the two parties 10, 11; the word "fuck you" will be filtered out of the dialog 20. The profanity score and the action to be taken can by edited a third party 60. In a further aspect of the present disclosure the word and phrase filter rules engine 33 will allow the dialog 20 to contain words and phrases that are present in the "black list" to be repeated to a predetermined number of occurrences. Once the predetermined number of occurrences has been reached then the action against one of the two parties 10, 11 will be taken. The action could include, but is not limited to, blocking the further use of the system or warning the user that it might be barred from the system in the future.

The censored dialog alert 42 is also saved to the storage device 110 and it may be sent to the third party 60 who can further moderate the dialog 20 between the first party and the second party 11.

In one aspect of the present disclosure the captured dialog 20, between the first party 10 and the second party 11 can be analyzed by the word and phrase filter engine 32 in real time as the dialog 20 occurs.

In a further aspect of the present disclosure the captured dialog 20, between the first party 10 and the second party 11 can be analyzed by the word and phrase filter engine 32 in delayed time. Analysis of the captured dialog 20 in delayed time will be because the one of the two parties 10, 11 is engaged in the dialog 20 with the other party 10, 11, whilst the other party is not actually engaged in the dialog 20 at the same time. For analysis of the captured dialog in delayed time, the dialog 20 saved to the storage device 110 and analyzed once both of the two parties are engaged in the dialog 20.

The censored dialog alert 42 which is created by the word and phrase filter engine 32 is transmitted to the third party 60 by the transmitter 105 present in relationship moderator engine 30. The third party 60 can for example be a parent or guardian of either of the two parties 10, 11. The third party 60 can for example be an officer of the law. The third party 60 can for example be a moderating team of the virtual chat network 15. The third party 60 can also offer an application programming interface to the virtual chat network 15. The application programming interface offers an interface to further monitoring software.

The word and phrase filter engine 32 allows the third party 60, such as a parent or a moderating team of the virtual chat network 15 to focus their energy on more serious and more sinister inappropriate dialog because the word and phrase filter rules engine 33 allows dialog which is not present on the "black list" of the word and phrase filter rules engine 33.

The word and phrase filter engine 32 conducts a basic analysis of the captured dialog 20. Suppose for example the captured dialog 20 occurs via a virtual chat network 15 which is provided for by a multimedia online game. The word and phrase filter engine 32 which is operating on the multimedia online game will be able to block out inappropriate dialog which is on the black list of words and phrases between the two parties 10, 11. The multimedia online game will then be able to perhaps ban any one or both of the two parties 10, 11 from the multimedia online game depending upon the inappropriate dialog 20. The banning (or silencing) of anyone of the two parties 10, 11 is an automated procedure. Should the inappropriate dialog 20 not warrant a banning of any one of the two parties 10, 11 then the multimedia online game will allow the two parties 10, 11 to possibly continue in their dialog 20 via the multimedia online game.

The word and phrase filter engine 32 will also analyze the captured dialog 20 to determine whether the captured dialog 20 includes an e-mail addresses that is the conventional form, for example me@me.com. The word and phrase filter engine 32 may not analyze the captured dialog 20 for the e-mail addresses that are not in the conventional form, for example "me AT me dot com" (or variations of the e-mail addresses that may not be in the conventional form). It will, however, be appreciated that later modifications may allow such analysis of the e-mail addresses not in the conventional form. Should the word and phrase filter engine 32 analyze captured dialog 20, that contains the e-mail address in the conventional form, the e-mail address will be blocked from the dialog between the two parties 10, 11 and not be displayed during the dialog to either one of the two parties 10, 11.

Where the captured dialog 20 is not totally blocked between the two parties 10, 11, following analysis by the word and phrase filter engine 32, the dialog 20 is then sent to a moderator stack. The moderator stack stores the dialog 20 for analysis of the dialog 20 by the concept filter engine 34 and the relationship status engine 36.

The concept filter engine 34 undertakes a more detailed analysis of the captured dialog 20 which was analyzed by the word and phrase filter engine 32.

The concept filter engine 34 analyses the captured dialog 20 by medium range dialog analysis. The concept filter engine 34 detects not only inappropriate content of the dialog 20 but also detects the first warning signs of an inappropriate relationship developing (e.g. cyber bullying relationship or predatory behavior) between the two parties 10,11.

The concept filter engine 34 analyses each line of the captured dialog 20. The concept filter engine 34 analyses the captured dialog 20 for any indication that the two parties 10, 11 are attempting to make direct contact. The direct contact would be an indication that two parties 10, 11 are attempting to make contact without the virtual chat network 15. The concept filter engine 34 analyses the dialog 20 for the presence of personal information relating to either of the two parties 10, 11. The personal information can for example include a home address, a telephone number, an email address or specific rendezvous information relating to either of the two parties 10, 11. The divulgence of the personal information by either of the two parties 10, 11 in the dialog 20 would allow the two parties 10, 11 to make direct contact.

The concept filter engine 34 gauges a level of threat that the captured dialog 20 represents. Instead of raising an alarm every time a word or phrase is matched, the concept filter engine 34 analyses the captured dialog 20, to create a concept behind the captured dialog.

The captured dialog 20 is analyzed using a "white list" and a "black list" of personal information provided for by a concept filter rules engine 35. Should specific personal information present in the "black list" of the concept filter rules engine 35 be present in the captured dialog 20 then a concept dialog alert 44 will be created. The concept dialog alert 44 is saved on the storage means 110 and is then sent to the third party 60 who can further moderate the dialog 20 between the first party 10 and the second party 11.

Parameters of the concept filter rules engine 35 are editable. The edit-ability of the concept filter rules engine 35 ensures that the concept filter rules engine 35 can be updated regularly to account for changes in language and personal information by either of the two parties. Changes in the language of the dialog 20 may take into account new slang terms and acronyms that may be used between the two parties 10, 11 engaged in the dialog 20.

The concept dialog alert 44 which is created by the concept filter engine 34 is transmitted to the third party 60 by the transmitter 105 present in relationship moderator engine 30. The third party 60 can for example be a parent or guardian of either of the two parties 10, 11. The third party 60 can for example be an officer of the law. The third party 60 can for example be a moderating team of the virtual chat network 15.

The third party 60 can assess the relationship between the two parties 10, 11 based upon the concept dialog alert 44. The concept dialog alert 44 comprises information regarding the captured dialog 20, specific words or phrases and personal information present in the captured dialog 20 following analysis of the captured dialog 20 by the concept filter engine 34.

The relationship status engine 36 analyses the captured dialog 20 by long range dialog analysis. The relationship status engine 36 is described in pending International Patent Application No. PCT/US2007/080008. The relationship status engine 36 identifies the most suspicious relationships between two parties 10, 11 based upon analysis of the captured dialog 20 by the relationship status engine 36. The relationship status engine 36 identifies the most suspicious relationship and trends by analysis of the captured dialog 20 between the two users 10, 11 before they become damaging. Sexual predatory behavior is purposefully more subtle and longer term in style than bullying behavior. A predators (such as a first user 10) will use methods which avoid arousing the suspicion of their victim (such as the second user 11) and even the third parties 60, by sidestepping emotional usage of language and focusing instead on areas that can help them to establish rapport and trust over weeks and months before revealing their true intentions. Due to the nature of "long range threats", keyword matching using the word and phrase filter engine 32 and the content filter engine 34 alone cannot always identify both parties 10,11 of such dialog.

The relationship status engine 36 analyses over two hundred elements of each relationship between two parties 10,11 based on the captured dialog 20 in order to determine underlying patterns used in the relationship between two parties 10,11. The relationship status engine 36 is used to identify grooming and predatory behavior.

The relationship status engine 36 analyses the captured dialog 20 over successive dialogs 20 and monitors the development of the relationship between the two parties 10, 11. By assessing and ranking any risks that exist within the relationship, the relationship status engine 36 provides the third party 60 with information needed to predict when an undesirable relationship and behavior is developing between the two parties 10, 11.

The relationship status engine 36 comprises a vulnerable user database 38 holding analysis of millions of lines of a child's virtual chat network 15, dialog 20. The relationship status engine 36 comprises a predator user database 39 holding analysis of millions of lines of a predators virtual chat network 15, dialog 20. The predator user database 39 comprises of extensive records taken from convicted "groomer" cases. From the vulnerable user database 38 and predator user database 39 the relationship status engine creates a dynamic, detailed behavioral profile of real-life groomers (i.e. second party 11) and real children (first user 10).

The relationship status engine 36 analyses the captured dialog 20, received from the content filter engine 34. The relationship status engine 36 analyses the dialog 20 between the first user 10 and the second user 11 and analyses what both users 10, 11 are saying and how they say it. The relationship status engine 36 understand the way in which the two parties 10, 11 direct the dialog 20. The relationship status engine 36 analyses over two hundred factors in each captured dialog 20. Some aspects of the analysis are simple, others are more technical.

For example the relationship status engine 36 examines typing speed, syntax and use of punctuation as well as aggression levels, sexual content and pattern recognition techniques used by either of the first party 10 or the second party 11.

As the relationship status engine 36 analyses more and more of the captured dialog 20, the relationship status engine 36 refines the vulnerable user database 38 and the predator user database 39 as well as the relationship status engines 36 ability to assess relationships and uncover negative or unhealthy trends in the relationship.

A relationship status alert 46 which is created by the relationship status engine 36 is transmitted to the third party 60 by the transmitter 105 present in relationship moderator engine 30. The relationship status alert 46 comprises information regarding the captured dialog 20 following analysis of the captured dialog 20 from the relationship status engine 36. The third party 60 can for example be a parent or guardian of either of the two parties 10, 11.

The third party 60 can for example be an officer of the law. The third party 60 can for example be a moderating team of the virtual chat network 15.

The third party 60 can moderate the relationship between the two parties 10, 11 based upon the relationship status alert 46. The relationship status alert 46 comprises information regarding the captured dialog 20.

The censored dialog alert 42, the concept dialog alert 44 and the relationship status alert 46 all relate to an incident occurring during the captured dialog 20. The censored dialog alert 42, the concept dialog alert 44 and the relationship status alert 46 are all dynamic due to changes in the profanity score of any of the censored dialog alert 42, the concept dialog alert 44 and the relationship status alert 46. If one of the two users 10, 11 uses inappropriate dialog 20 any of the censored dialog alert 42, the concept dialog alert 44 and the relationship status alert 46 will receive an increased profanity score. The increased profanity score results in any of the profanity score the censored dialog alert 42, the concept dialog alert 44 and the relationship status alert 46 being prioritized. As a result of the prioritization of any of the censored dialog alert 42, the concept dialog alert 44 and the relationship status alert 46 the incident occurring during the captured dialog 20 can be swiftly dealt with by the third party 60. Conversely if one of the two users 10, 11 uses dialog 20 which is appropriate then the profanity score is reduced which results in a reduction in the priority of any of any of the censored dialog alert 42, the concept dialog alert 44 and the relationship status alert 46.

Each one of the censored dialog alert 42, the concept dialog alert 44 and the relationship status alert 46 produce an input for the incident based on the profanity score of the incident.

The censored dialog alert 42, the concept dialog alert 44 and the relationship status alert 46 are sent from the relationship moderator engine 30 to the third party 60 by the transmitter 105 of the relationship moderator engine 30.

In an aspect of the present disclosure, the censored dialog alert 42, the concept dialog alert 44 and the relationship status alert 46 may be sent to the third party 60 via a costumer relationship management interface 52. The costumer relationship manager interface 52 is a well-known and commercial costumer relationship manager interface such as that provided by Parature, Microsoft Dynamics and Sales Force.

In a further aspect of the present disclosure, the censored dialog alert 42, the concept dialog alert 44 and the relationship status alert 46 is sent to the third party 60 via a relationship moderator alert interface 54. The relationship moderator alert interface 54 organizes the censored dialog alert 42, the concept dialog alert 44 and the relationship status alert 46 into a readily actionable format for the third party 60. The readily actionable format provided by the relationship moderator alert interface 54 enables the third party 60 for example to prioritize any of the censored dialog alert 42, the concept dialog 44 and the relationship status alert 46 or to take an overview of an inappropriate relationship occurring within the virtual chat network 15 by the two parties 10, 11.

The relationship moderator alert interface 54 is tailored specifically to the virtual chat network 15 and delivers the following functions. The relationship moderator alert interface 54 displays the censored dialog alert 42, the concept dialog 44 alert and the relationship status alert 46. The relationship moderator alert interface 54 allows the third party 60 to rapidly view the relationship and behavior patterns of the parties 10, 11 of the dialog 20 of the virtual chat network 15. The relationship moderator alert interface 54 allows the third party 60 to prioritize any of the censored dialog alert 42, the concept dialog alert 44 and the relationship status alert 46. The relationship moderator alert interface 54 allows the third party 60 to compile a list of users of the virtual chat network 15 that are periodically involved in inappropriate dialog 20. The relationship moderator alert interface 54 allows the moderator 60 to view each individual dialog 20, the censored dialog alert 42, the concept dialog alert 44 and the relationship status alert. The relationship moderator alert interface 54 also allows the third party 60 to view each individual dialog 20 between the two parties 10, 11. The dialog 20 between the first party 10 and the second party 11 can be viewed by the third party 60 via the relationship moderator alert interface 54 in real time or in delayed time, the moderator 60 can also recall a saved dialog 20 from the relationship moderator engine 30. The saved dialog 20 will be recalled from the storage device 110 of the relationship moderator engine 30.

The relationship moderator alert interface 54 allows the third party 60 to provide a certain response based on the moderation of the dialog 20 between the two parties 10, 11. For example the third party 60 may ban either of the first party 10 or the second party 11 from being involved in a dialog 20 using the virtual chat network 15. The relationship moderator alert interface 54 may also be automated to notify a legal entity (such as the police for example) in circumstances where the dialog 20 between the first user 10 and the second user 11 is deemed to be illegal.

Figure 2:
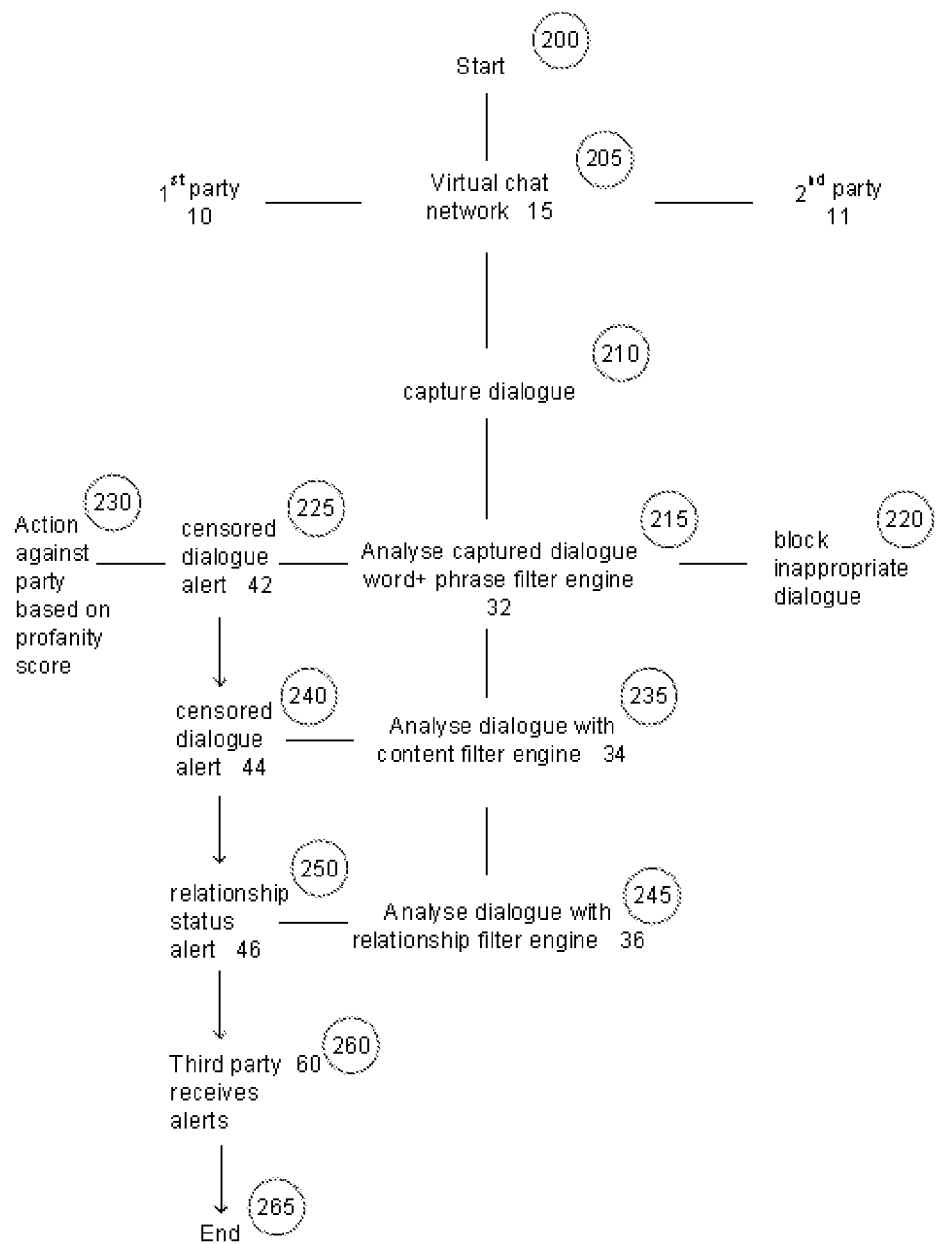
FIG. 2 shows a method for analyzing dialog according to an aspect of the present disclosure.

FIG. 2 shows a schematic for the method of moderating and monitoring a relationship between two parties 10, 11 based on analyzing a dialog between the two parties 10 and 11. The method starts in step 200.

In step 205 the two parties 10 and 11 enter the dialog 20 in the virtual chat network 15.

In step 210 the dialog 20 between the two parties 10, 11 is captured.

In step 215 the captured dialog 20 is analyzed by the word and phrase filter engine 32. The captured dialog is analyzed using the "white list" and the "black list" of the word and phrase filter rules engine 33.

In step 220 the word and phrase filter engine 32 is able to block any inappropriate dialog 20 before the inappropriate dialog reaches any one of the two parties 10, 11.

In step 225 the censored dialog alert 42 is provided by the word and phrase filter engine 32. The censored dialog alert 42 comprises information relating to the dialog 20 and includes words and phrases that have been analyzed from the dialog 20 by the word and phrase filter rules engine 33.

In step 230 the virtual chat network 15 can act upon the censored dialog alert 42 and can for example ban or silence one of the two parties 10, 11. This achieved based upon the profanity score of the analyzed dialog 20, as discussed above.

In step 235 the captured dialog 20 that has been analyzed by the word and phrase filter engine 32 is then analyzed by the concept filter engine 34. The content filter engine 34 detects not only inappropriate content of the dialog 20, but also detects the first warning signs of the inappropriate relationship developing between the two parties 10, 11. The concept filter engine 34 analyses each line of the captured dialog 20 for any indication that the two parties 10, 11 are attempting to make direct contact.

In step 240 the concept dialog alert 44 is made which comprises information regarding the analysis of the dialog 20 by the concept filter engine 34.

Following the analysis of the captured dialog 20 by the concept filter engine 34, the captured dialog 20 is analyzed by the relationship status engine 36 in step 245. The relationship status engine 36 identifies the most suspicious relationships between the two parties 10, 11 based upon analysis of the captured dialog 20. The relationship status engine 36 analyses the captured dialog 20 over successive dialogs and monitors the development of the relationship between the two parties 10, 11.

In step 250 the relationship status alert is created by the relationship status engine 36. The relationship status alert 46 comprises information regarding the captured dialog 20 that has been analyzed by the relationship status engine 36.

In step 260 each one of the censored dialog alert 42, the concept dialog alert 44 and the relationship status alert 46 are transmitted to the third party 60. The censored dialog alert 42, the concept dialog alert 44 and the relationship status alert 46 are transmitted to third party 60 by the transmitter 105. The third party 60 is then able to take action against any of the two parties 10 and 11 based upon the analysis of the captured dialog 20.

The method ends in step 265.

Having thus described the present disclosure in detail, it is to be understood that the foregoing detailed description of the disclosure is not intended to limit the scope of the disclosure thereof. Those of ordinary skill in the art will recognize other variants, modifications and alternatives in light of the foregoing discussion.

Set out below is a listing of reference numerals for ease of reference, with respect to the drawings hereof and the appertaining description.

REFERENCE NUMERALS

10—First party
11—Second party
15—virtual chat network
20—dialog between two parties
30—relationship moderator engine
32—word and phrase filter engine
33—word and phrase filter rules engine
34—concept filter engine
35—concept filter rules engine
36—relationship status analysis engine
38—vulnerable user database
39—predator user database
42—censored dialog alert
44—dialog concept alert
46—relationship status alert
52—customer relationship interface
54—relationship moderator alert interface
60—third party
100—apparatus
105—transmitter
110—storage device
115—processor

What is claimed is:

1. A computer-implemented method for the monitoring of a relationship based on a dialogue between two or more parties comprising:

capturing the dialogue from a virtual chat network,
analysing the dialogue with a word and phrase filter engine to produce a censored dialogue alert,
analysing the dialogue with a concept filter engine to determine a concept of the dialogue and to produce a concept dialogue alert,
moderating the relationship between two parties based upon the censored dialogue alert and the concept dialogue alert.

2. The method according to claim 1, further comprising analysing the dialogue of each one of the two parties with a relationship status analysis engine to produce a relationship status alert.

3. The method according to claim 2, wherein the any one of the censored dialogue alert the concept dialogue alert and the relationship status alert are sent to a third party for moderating.

4. The method according to claim 3, wherein the third party is a moderator of the virtual chat network.

5. The method according to claim 1, wherein analysing the dialogue with the word and phrase filter engine occurs in real time.

6. The method according to claim 1, wherein analysing the dialogue with the word and phrase filter engine occurs in delayed time.

7. The method according to claim 3, wherein a dynamic behavioural profile of each of the two parties is created by comparing a known dialogue pattern of a first party and a known dialogue pattern of the second party with the captured dialogue between the two parties.

8. The method according to claim 1, wherein moderating the relationship between the two parties using the censored dialogue alert and the concept dialogue alert terminates the dialogue between the two parties.

9. The method according to claim 1, wherein the virtual chat network selected from any one of one of an online social network, a massively multimedia online game (MMOG) network, an online instant messaging application or a SMS based application.

10. The method according to claim 1, wherein the two parties comprise of a child and an adult.

11. The method according to claim 1, wherein the relationship between the two parties is an illegal relationship.

12. The method according to claim 1, wherein the moderating of the relationship between the two parties results in banning the dialogue between the two parties and/or blocking the dialogue between the two parties.

13. The method according to claim 1, wherein the dialogue is a single session or occurs over a plurality of sessions.

14. The method according to claim 1, wherein any one of the censored dialogue alert, the concept dialogue alert and the relations status alert is sent to a legal entity.

15. The method according to claim 2, wherein any one of the censored dialogue alert, the concept dialogue alert and the relationship status alert is sent to a moderator using a relationship alert interface.

16. The method according to claim 15, wherein the relationship alert interface prioritises the censored dialogue alert, the concept dialogue alert and the relationship status alert.

17. The method according to claim 1, wherein the word and phrase filter engine analyses the dialogue using a word and phrase filter rules engine to determine matching words in the dialogue that appear in the word and phrase filter rules engine.

18. The method according to claim 17, wherein the word and phrase filter rules engine comprises editable parameters.

19. The method according to claim 1, wherein the concept filter engine analyses the dialogue using a concept filter rules engine to determine personal information in the dialogue.

20. The method according to claim 19, wherein the personal information includes any of a telephone number, an address, an email address.

\* \* \* \* \*